(12) United States Patent
Dechristopher et al.

(10) Patent No.: US 11,412,658 B2
(45) Date of Patent: Aug. 16, 2022

(54) TORSION BALANCED HARVESTER HEAD

(71) Applicant: CNH Industrial America LLC, New Holland, PA (US)

(72) Inventors: David M. Dechristopher, Ephrata, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 307 days.

(21) Appl. No.: 16/670,087

(22) Filed: Oct. 31, 2019

(65) Prior Publication Data

US 2021/0127574 A1 May 6, 2021

(51) Int. Cl.
| | | |
|---|---|---|
| *A01D 41/14* | (2006.01) | |
| *A01B 63/10* | (2006.01) | |
| *A01D 41/06* | (2006.01) | |
| *A01D 41/127* | (2006.01) | |

(52) U.S. Cl.
CPC .............. *A01D 41/14* (2013.01); *A01B 63/10* (2013.01); *A01D 41/06* (2013.01); *A01D 41/127* (2013.01); *A01D 41/145* (2013.01)

(58) Field of Classification Search
CPC ...... A01D 41/06; A01D 41/14; A01D 41/145; A01D 57/02; A01D 57/16; A01B 63/10
See application file for complete search history.

(56) References Cited

U.S. PATENT DOCUMENTS

| | | | | |
|---|---|---|---|---|
| 4,414,792 A | * | 11/1983 | Bettencourt | A01D 41/141 56/10.2 E |
| 5,005,343 A | * | 4/1991 | Patterson | A01D 41/14 56/14.4 |
| 5,243,810 A | * | 9/1993 | Fox | A01B 73/005 56/14.4 |
| 7,971,420 B1 | * | 7/2011 | Bollin | A01D 41/145 56/208 |
| 9,148,998 B2 | * | 10/2015 | Bollin | A01D 41/141 |
| 9,775,291 B2 | | 10/2017 | Neudorf | |
| 10,216,156 B2 | | 2/2019 | Enns et al. | |

(Continued)

FOREIGN PATENT DOCUMENTS

| | | | | |
|---|---|---|---|---|
| GB | 1168967 | | 10/1969 | |
| GB | 1168967 A | * | 10/1969 | ........... A01D 41/141 |

(Continued)

OTHER PUBLICATIONS

Extended European Search Report for EP Application No. 20205032.4 dated Mar. 24, 2021 (six pages).

*Primary Examiner* — Adam J Behrens
(74) *Attorney, Agent, or Firm* — Peter Zacharias; Patrick Sheldrake

(57) ABSTRACT

An agricultural vehicle header includes a frame supporting components of the agricultural vehicle header. A reel is mounted to the frame such that a weight of the reel produces a bending moment on the frame in a first direction that can cause the header to droop toward a ground surface. A gauge wheel is mounted to the frame such that a normal force, which is produced by the gauge wheel on the ground surface, is transmitted to the frame to cause a bending moment on the frame in a second direction that is opposite to the first direction in order to either limit or prevent drooping of the header toward the ground surface.

21 Claims, 2 Drawing Sheets

(56) References Cited

U.S. PATENT DOCUMENTS

| | | | |
|---|---|---|---|
| 10,299,435 B2* | 5/2019 | Noll | A01D 41/127 |
| 10,321,629 B2* | 6/2019 | Talbot | A01D 41/148 |
| 2014/0041351 A1* | 2/2014 | Bollin | A01D 41/141 |
| | | | 56/10.2 E |
| 2015/0271999 A1* | 10/2015 | Enns | A01D 41/141 |
| | | | 700/275 |
| 2016/0183461 A1* | 6/2016 | Neudorf | A01D 41/14 |
| | | | 56/158 |
| 2016/0309652 A1* | 10/2016 | Remillard | A01D 41/14 |
| 2017/0055450 A1* | 3/2017 | Jasper | A01D 57/02 |
| 2018/0310476 A1* | 11/2018 | Brimeyer | A01D 41/145 |
| 2018/0338425 A1 | 11/2018 | Cook | |
| 2019/0029175 A1* | 1/2019 | Talbot | A01D 41/145 |
| 2020/0375107 A1* | 12/2020 | Duerksen | A01D 57/20 |
| 2020/0390030 A1* | 12/2020 | Remillard | A01D 69/005 |

FOREIGN PATENT DOCUMENTS

| | | |
|---|---|---|
| WO | 2007095430 A2 | 8/2007 |
| WO | 2019023312 A1 | 1/2019 |

* cited by examiner

TORSION BALANCED HARVESTER HEAD

FIELD OF THE INVENTION

This invention is related to header for an agricultural harvester including a combine or windrower, and more particularly, a header that balances the weight of a reel (or other feature) that is suspended therefrom to limit drooping of the header.

BACKGROUND OF THE INVENTION

Agricultural equipment, such as combines, swathers and windrowers, typically include a header that is movably attached to the chassis of the vehicle. During operation, the header might be raised or lowered to account for variations in the ground level, properties of the particular crop being harvested, and various other operating conditions. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. The header typically is a harvesting mechanism, but alternatively may be a sprayer beam or other laterally-elongate structure.

Headers are often designed to follow the contours of the crop field to cut the crops at a uniform height across the width of the header. To this end, the cutter bar of the header may be mounted on flexible forward-extending arms that allow the cutter bar to raise and lower according to the local ground level.

While ground-following is desirable, relatively wide harvester headers, particularly multi-segment headers, can experience significant deflection due to the weight of the header. This deflection is also sometimes perceived as giving an undesirable appearance to the header, which can lead to customer dissatisfaction or rejection of the header in favor of other options, even if the deflection has minimal effect on the header's performance.

Header deflection can be reduced by making the parts stiffer, but this can lead to excessive weight. Thus, header design requires an optimization of stiffness and weight, and there is a continued need to advance the art of header design.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header that includes a frame supporting components of the agricultural vehicle header. A reel is mounted to the frame such that a weight of the reel produces a bending moment on the frame in a first direction that can cause the header to droop toward a ground surface. A gauge wheel is mounted to the frame such that a normal force, which is produced by the gauge wheel on the ground surface, is transmitted to the frame to cause a bending moment on the frame in a second direction that is opposite to the first direction in order to either limit or prevent drooping of the header toward the ground surface.

In another exemplary aspect, there is provided an agricultural vehicle header comprising a frame including a top frame member, a bottom frame member positioned at an elevation below the top frame member, and at least one supporting member extending between the top frame member and the bottom frame member. The top frame member has a torsional centroid. A reel mounting portion is defined on the top frame member to which a reel is either directly or indirectly mounted. The reel mounting portion is disposed at a location that is forward of the top frame torsional centroid, as viewed in a forward direction of travel of an agricultural vehicle to which the agricultural vehicle header is attached. A first gauge wheel mounting portion is defined on the top frame member at a location that is forward of the top frame torsional centroid, as viewed in the forward direction of travel. A second gauge wheel mounting portion is defined on the bottom frame member. The first and second gauge wheel mounting portions are configured to be connected either directly or indirectly to a gauge wheel.

In any of the foregoing aspects, the header may be part of an agricultural vehicle having a chassis configured for movement on a surface. The vehicle may include a threshing and separating system mounted to the chassis, and the center section may be operatively connected to the threshing and separating system by a feeder housing.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Exemplary embodiments of the present invention provide apparatus for reducing the deflection of headers for agricultural harvester equipment, such as combines, swathers, windrowers, and the like. It will be appreciated that other embodiments may be used in other types of machines having a similar arrangement of parts, upon incorporation of the appropriate features of the inventions herein.

Figure 1:
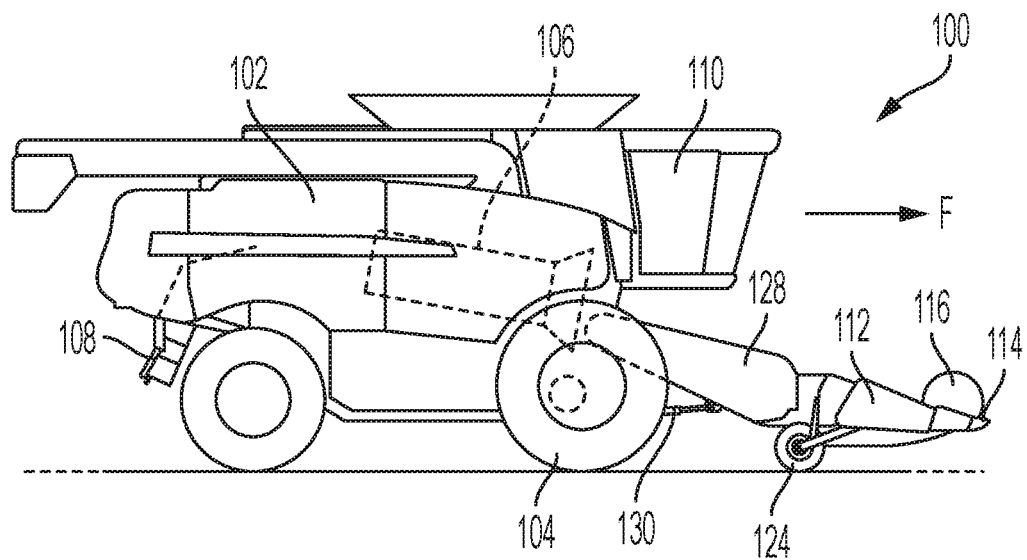
FIG. 1 is a side view of an agricultural vehicle that may include embodiments of the present invention.

FIG. 1 illustrates an example of an agricultural combine 100 with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, an operator cab 110, and so on.

Figure 2:
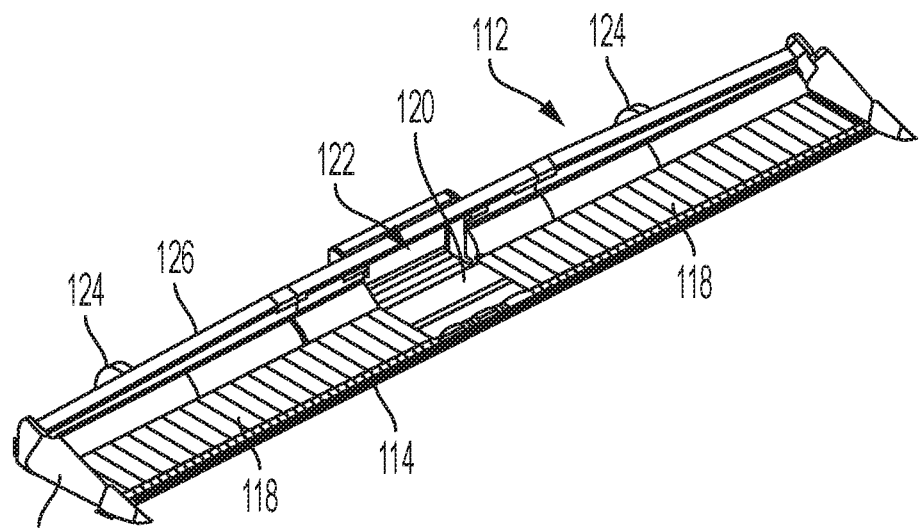
FIG. 2 is an isometric view taken from the front and left sides of a header that may include embodiments of the present invention.

Referring also to FIG. 2, the combine 100 also includes a header 112, which is configured to cut and harvest crop material from the ground as the combine 100 drives in the forward direction F. The header 112 may include one or more cutter bars 114 located at or near the leading edge of the header 112 to cut crops at or near the ground level, and one or more reels 116 having tines 117 configured to pull the crop material backwards towards the cutter bars 114 of the header 112. The reels 116 are not shown in FIG. 2. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include supports in the form of gauge wheels 124 or skids to control the height of the header 112 over the ground and support the weight of the header 112. The gauge wheels 124 may be pneumatic tires, for example. The sides of the header 112 are capped by panels 125. Further details of a header are disclosed in U.S. Patent App. Pub. No. 20180338425 to CNH Industrial America LLC, which is incorporated by reference herein in its entirety and for all purposes.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more actuators 130 to change the position of the header 112 relative to the ground.

Figure 3:
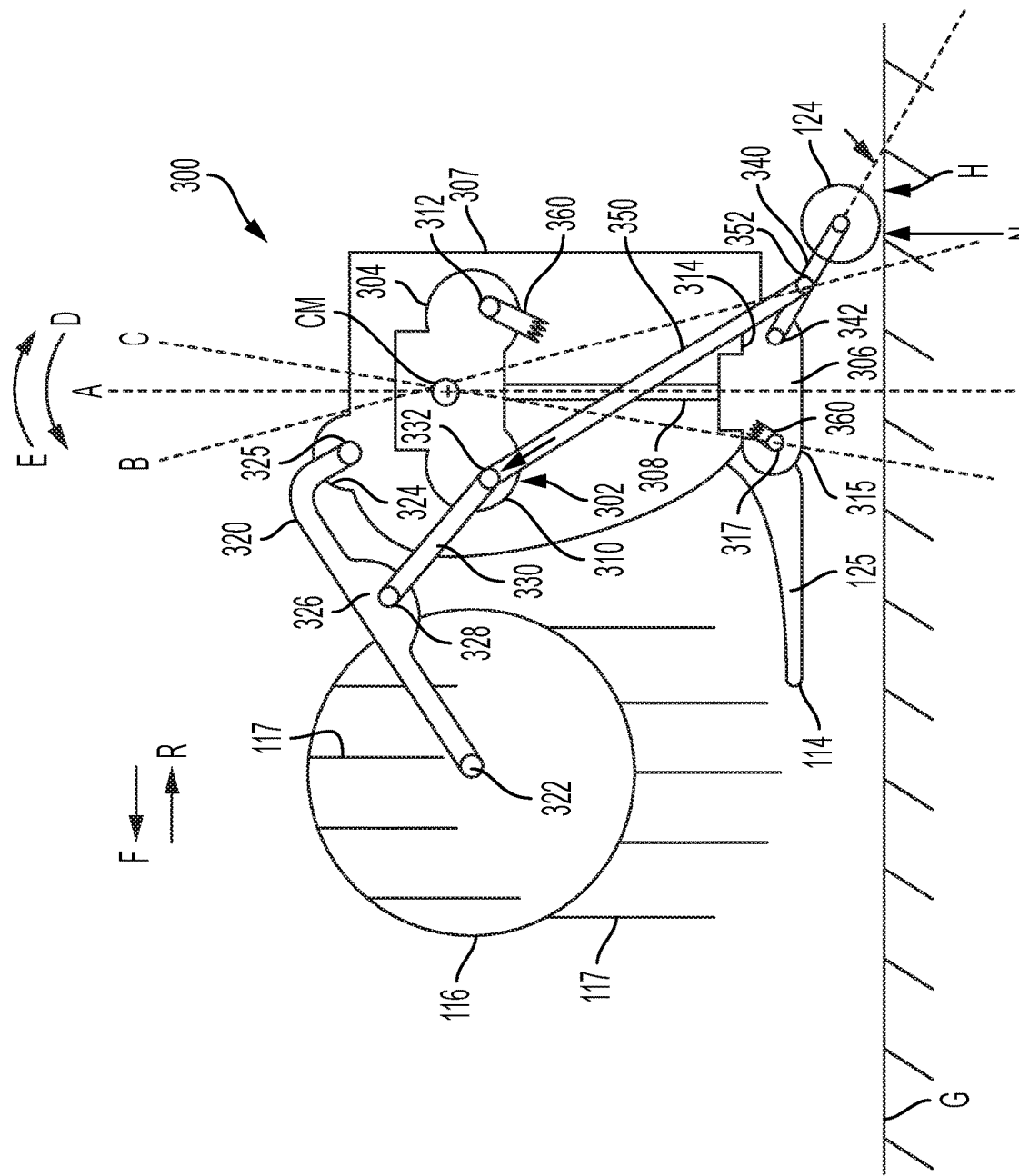
FIG. 3 is a right side schematic view of a header for use with the agricultural vehicle of FIG. 1.

FIG. 3 is a right side schematic view of a header for use with the agricultural vehicle of FIG. 1. The header is similar to the headers of FIGS. 1 and 2, and the primary differences therebetween will be described hereinafter.

The header 300 includes a structural frame 302 that extends transversely, and which is attached to the chassis 102 of the combine 100 by the feeder housing 128. The frame 302 includes a top frame member 304, a bottom frame member 306, and a plurality of vertically oriented supporting members 308 (one shown) that extend between the top and bottom frame members 304 and 306. The top and bottom frame members 304 and 306 may also be referred to as beams, and the supporting members 308 may also be referred to as stringers.

The top frame member 304 is configured to flex or otherwise move independently of the bottom frame member 306 due to the flexible properties of the supporting members 308. Stated differently, the supporting members 308 are configured to accommodate the relative motion between the frame members 304 and 306 in the forward and rearward directions. The flexibility of the supporting members 308 is greater than that of the frame members 304 and 306. Also, the stiffness of the supporting members 308 is less than that of the frame members 304 and 306.

A longitudinal axis A of the frame 302 extends longitudinally along the height dimension of the frame (in relation to the ground 'G'). The axis A passes through (i) the centroid (CM) of torsional stiffness of the frame member 304, (ii) the physical center of the frame member 304, (iii) the center of gravity of frame member 304, and/or (iv) the center of mass of frame member 304. The axis A may be vertical or titled with respect to a vertical axis as shown in FIG. 3.

A vertically oriented plate 307 is connected to (at least) the top member 304 of the frame 302 by one or more fasteners (not shown). The plate 307 may be considered as either a part of the frame 302, or a part that is separate from the frame 302. Although only one plate 307 is shown, it should be understood that a plurality of plates 307 may be spaced apart along the length of the frame 302.

The frame 302 includes multiple mounting portions to which other components are attached. More particularly, a mounting portion 310 is disposed toward the top end of frame 302 at a location that is forward of the centroid (CM) and axis A (i.e., in the forward direction F). Similarly, a mounting portion 312 is disposed toward the top end of frame 302 at a location that is rearward of the centroid (CM) and axis A. The mounting portions 310 and 312 may be disposed at a location either above or below the centroid (CM). A mounting portion 314 is disposed rearward of the centroid (CM) and axis A and below the centroid (CM). A mounting portion 315 is disposed forward of the axis A and below the centroid (CM). It should be understood that the mounting portions 314 and 315 are not attached to or disposed on the top frame member 304, and their locations may vary. Each mounting portion is a portion of the frame that is configured to be connected to a link, linkage, bearing member, cylinder, and so forth. Each mounting portion may be reinforced, for example. Each mounting portion may also include an opening (as shown) or other feature to accommodate mounting of a link or spring, for example.

The one or more reels 116 are suspended forwardly from the top end of the frame 302. The reels 116 are positioned forwardly of the frame 302, as well as the axis A of the frame 302. A link 320, which may also be referred to as a reel arm, is connected between a hub 322 of the reel 116 and a mounting point 324 on the plate 307. The link 320 may be connected to the top frame member 304 in lieu of the plate 307. The link 320 supports the weight of the reel 116. The link 320 may or may not be configured to pivot about the connection point 325. A reinforced portion 326 is defined at the approximate mid-span of the link 320.

A link 330 extends between a connection point 328 on the link 320 and a connection point 332 on the mounting portion 310 of the top frame member 304. The link 330 at least partially supports the weight of the reel 116. The links 320 and 330 may be together considered and referred to as reel link or linkage for supporting the reel 116.

It is noted that the connection point 332 on the top frame member 304 for receiving one end of the link 330 is positioned forwardly of the centroid (CM). The link 330 may or may not be configured to pivot about the connection points 328 and 332. By virtue of the forward location of the connection point 332 on the top frame member 304 and the forward location of the reel 116, the weight of the reel 116 produces a bending moment 'D' on the top frame member 304 in a counterclockwise direction. The reel 116 creates bending moment D because gravity acts in a purely vertical direction and the reel 116 is located forward of axis A that passes through the top beam member 304. The bending moment D tends to cause the header 300 to droop downward toward the ground G. However, as will be described hereinafter, a linkage extending from the gauge wheel 124 is connected to the frame 302 to counteract the bending moment D.

More particularly, the hub of the gauge wheel 124 is connected to one end of a link 340. The other end of the link 340 is connected to the mounting portion 314 of the bottom frame member 306 at the connection point 342. The link 340 may be configured to pivot about the connection point 342. The location of connection point 342 may vary from that which is shown so long as the connection point 342 produces an upward force through member 350.

A link 350 is connected between the link 340 and the connection point 332 on the top frame member 304. More particularly, a first end of the link 350 is connected at a connection point 352 at the approximate mid-span of the link 340. An imaginary axis B passes through the centroid CM and the connection point 352. The connection point 332 is located forward of axis B in order to create a moment E, which will be described later. The link 350 is configured to pivot about the connection point 352. Alternatively, the first end of the link 350 may be connected to the hub of the gauge wheel 124. The second end of the link 350 is connected to the connection point 332 on the top frame member 304, and the link 350 is configured to pivot with respect to the connection point 332. The link 350 may be a structural beam, a spring, a shock absorber, or a cylinder. The cylinder may be a hydraulic cylinder for example, that is controlled by the operator of the combine to adjust the angle 'H' of the link 340 with respect to the ground G. Adjusting the angle 'H' consequently adjusts the height of the header 300 with respect to the ground G.

The links 340 and 350, which may be together be referred to as gauge wheel links, transfer the upward normal force 'N' applied by the ground against the wheel 124 onto the connection point 332 in the direction of the arrows at connection point 332. By virtue of force at the connection point 332, which is applied at a location that is forward of the centroid CM as well as forward of axis B, the normal force 'N' produces a bending moment 'E' on the top frame member 304 in a clockwise direction. The bending moment 'E' at least partially counteracts the bending moment 'D' caused by the weight of the reel 116, which either prevents or limits drooping of the header 300 toward the ground G. Thus, the moment applied to the top frame member 304 by the reel 116 and the normal force N is the moment D subtracted by the moment E.

For comparison purposes, in other headers, the upper end of the link 350 may be connected at connection point 312, which would exacerbate the bending moment D and increase the tendency of the header 300 to droop downward toward the ground G.

As used herein, the connection point 332 may be referred to as both the reel mounting portion and the first gauge wheel mounting portion on the header frame 302. Although not shown, the reel mounting portion and the first gauge wheel mounting portion may be separated into two separate connection points on the header frame 302. The connection point 342 may be referred to herein as the second gauge wheel mounting portion on the header frame 302.

Although not shown, a bearing may be disposed at each connection point to enable pivoting action of the respective links.

A reinforcing member 360 (only the connected ends of which are depicted in FIG. 3) is mounted to the opposing mounting portions 312 and 315. The reinforcing member is mounted to mounting portion 315 at point 317. An imaginary axis 'C' passes through the centroid CM and the connection point 317. The reinforcing member 360 may be a pre-tensioned spring, a tensional turnbuckle, a hydraulic cylinder, or a rigid bar, for example. In the same manner as link 350, the reinforcing member 360 is configured to generate an additional counterclockwise moment 'E' to further resist the bending moment 'D' caused by the weight of the reel 116, which either prevents or limits drooping of the header 300 toward the ground G. The reinforcing member 360 is an optional component.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed is:

1. An agricultural vehicle header comprising:
    a frame comprising a top frame member having a torsional centroid, a bottom frame member positioned at an elevation below the top frame member, and at least one supporting member extending between the top frame member and the bottom frame member;
    a reel mounting portion defined on the top frame member to which a reel is either directly or indirectly mounted, the reel mounting portion being disposed at a location that is forward of the top frame torsional centroid, as viewed in a forward direction of travel of an agricultural vehicle to which the agricultural vehicle header is attached;
    a first gauge wheel mounting portion defined on the top frame member at a location that is forward of the torsional centroid, as viewed in the forward direction of travel; and
    a second gauge wheel mounting portion defined on the bottom frame member, the first and second gauge wheel mounting portions being configured to be connected either directly or indirectly to a gauge wheel.

2. The agricultural vehicle header of claim 1 further comprising a reel link that is configured to connect the reel to the reel mounting portion of the top frame member of the frame.

3. The agricultural vehicle header of claim 2, further comprising the reel mounted to the reel link.

4. The agricultural vehicle header of claim 3, wherein the reel is positioned forward of the torsional centroid.

5. The agricultural vehicle header of claim 3, wherein the reel link is also connected to another location on the header.

6. The agricultural vehicle header of claim 1, wherein said at least one supporting member is configured to flex in order to permit movement of the top frame member with respect to the bottom frame member, or vice versa.

7. The agricultural vehicle header of claim 1, wherein a flexibility of the at least one supporting member is greater than the flexibility of each of the top frame member and the bottom frame member.

8. The agricultural vehicle header of claim 1, wherein a stiffness of the at least one supporting member is less than the stiffness of each of the top frame member and the bottom frame member.

9. The agricultural vehicle header of claim 1 further comprising a first gauge wheel link that is connected to the second gauge wheel mounting portion, the first gauge wheel link being configured to interconnect a gauge wheel to the frame.

10. The agricultural vehicle header of claim 9, further comprising the gauge wheel.

11. The agricultural vehicle header of claim 10, wherein the gauge wheel is positioned rearward of the centroid, as viewed in the forward direction of travel.

12. The agricultural vehicle header of claim 9, further comprising a second gauge wheel link that is configured to be connected to (i) either the gauge wheel or the first gauge wheel link, and (ii) the first gauge wheel mounting portion, wherein the first and second gauge wheel links are together configured to produce a bending moment on the frame that is opposite to a bending moment on the frame produced by a weight of the reel.

13. The agricultural vehicle header of claim 12, wherein the second gauge wheel link is a hydraulic.

14. The agricultural vehicle header of claim 1, further comprising a reinforcement member connected to the top frame member at a first location that is rearward of the centroid, and a second location on the header.

15. The agricultural vehicle header of claim 14, wherein the reinforcement member is a pre-tensioned spring, a hydraulic cylinder, a beam, a shaft or a turnbuckle.

16. An agricultural vehicle comprising the agricultural vehicle header of claim 1.

17. An agricultural vehicle header comprising:
- a frame for supporting components of the agricultural vehicle header;
- a reel mounted to the frame by a reel link such that a weight of the reel produces a bending moment on the frame via the reel link in a first direction to cause the header to droop toward a ground surface;
- a gauge wheel mounted to the frame by a gauge wheel link,
- wherein the reel link and the gauge wheel link are each connected at a top end of the frame and at a location that is forward of a centroid of the frame such that a normal force, which is produced by the gauge wheel on the ground surface, is transmitted to the frame via the gauge wheel link to cause a bending moment on the frame in a second direction that is opposite to the first direction in order to either limit or prevent drooping of the header toward the ground surface.

18. The agricultural vehicle header of claim 17, wherein the reel link is connected to a reel mounting portion of the frame, the reel mounting portion being disposed at a location that is forward of the centroid of the frame, as viewed in a forward direction of travel of an agricultural vehicle to which the agricultural vehicle header is attached.

19. The agricultural vehicle header of claim 18, wherein the gauge wheel link is connected to a first gauge wheel mounting portion on the frame that is defined at a location that is forward of the centroid, as viewed in the forward direction of travel.

20. The agricultural vehicle header of claim 19, wherein the frame comprises a top frame member, a bottom frame member positioned at an elevation below the top frame member, and at least one supporting member extending between the top frame member and the bottom frame member, wherein the reel mounting portion and the first gauge wheel mounting portion are disposed on the top frame member.

21. The agricultural vehicle header of claim 17, wherein the reel link and the gauge wheel link are connected together at the top end of the frame.

\* \* \* \* \*